(12) United States Patent
Francis

(10) Patent No.: US 8,800,935 B2
(45) Date of Patent: Aug. 12, 2014

(54) SPACECRAFT PAYLOAD POSITIONING WITH RESPECT TO A VIRTUAL PIVOT POINT

(75) Inventor: Colin M. Francis, Redwood City, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 350 days.

(21) Appl. No.: 13/044,278

(22) Filed: Mar. 9, 2011

(65) Prior Publication Data

US 2012/0228436 A1 Sep. 13, 2012

(51) Int. Cl.
*B64G 1/22* (2006.01)
(52) U.S. Cl.
USPC ...................................................... 244/172.6
(58) Field of Classification Search
USPC ........... 244/158.1, 172.6, 172.7, 172.8, 173.1
See application file for complete search history.

(56) References Cited

U.S. PATENT DOCUMENTS

| | | | | |
|---|---|---|---|---|
| 2,599,381 A | * | 6/1952 | Gerks | 318/625 |
| 3,711,055 A | * | 1/1973 | Schultz et al. | 248/425 |
| 4,149,521 A | * | 4/1979 | Fletcher et al. | 126/693 |
| 4,368,962 A | * | 1/1983 | Hultberg | 353/3 |
| 5,229,781 A | | 7/1993 | Losquadro et al. | |
| 6,669,147 B2 | * | 12/2003 | Bertheux et al. | 244/172.6 |
| 6,679,455 B2 | * | 1/2004 | Chatenet | 244/171.2 |
| 6,990,396 B2 | * | 1/2006 | Wang et al. | 701/13 |
| 7,602,349 B2 | * | 10/2009 | Hentosh et al. | 343/882 |
| 7,686,255 B2 | * | 3/2010 | Harris | 244/159.5 |
| 7,874,520 B2 | * | 1/2011 | McKinnon et al. | 244/171.8 |
| 2008/0111031 A1 | * | 5/2008 | Mobrem | 244/172.6 |

OTHER PUBLICATIONS

Wie, Bong; Space Vehicle Dynamics and Control; 2008; American Institute of Aeronautics and Astronatics, Inc.; Second Edition; pp. 60-70.*
MOOG Space and Defense Group; Type 2 Solar Array Drive Assembly (SADA); 2010; MOOG Space and Defense Group.*

* cited by examiner

*Primary Examiner* — Tien Dinh
*Assistant Examiner* — Michael A Fabula
(74) *Attorney, Agent, or Firm* — Weaver Austin Villeneuve & Sampson LLP

(57) ABSTRACT

A spacecraft payload element is rotated by a mechanism about virtual pivot point (VPP) substantially distant from the mechanism. The mechanism couples the payload element to a spacecraft main body structure, and has a four-bar linkage configured to rotate the payload element about a virtual pivot point (VPP). The VPP may be proximate to the focus or center of gravity (cg) of the payload element. Rotation of the payload element about the VPP may be controlled by linear or rotary actuators which drive the four-bar linkage. The four-bar linkage may be configured to provide a mechanical advantage to the actuator.

27 Claims, 10 Drawing Sheets

SPACECRAFT PAYLOAD POSITIONING WITH RESPECT TO A VIRTUAL PIVOT POINT

TECHNICAL FIELD

This invention relates generally to spacecraft and, in particular, to methods and apparatus for providing payload positioning with respect to a virtual pivot point.

BACKGROUND OF THE INVENTION

The assignee of the present invention manufactures and deploys spacecraft for communications and broadcast services. To meet market demands for advanced services from such spacecraft, spacecraft payloads of increased size and improved pointing performance are required. For example, there is a demand for increased aperture antenna reflectors, having diameters of three meters or greater, and larger, more complex, radio frequency (RF) feed arrays. A payload element, such as, for example, an antenna reflector, and/or an RF feed array, often require one or more positioning mechanisms configured to provide for (i) initial deployment of the payload element from a stowed launch position to an (on-orbit) operating position, and/or (ii) on-orbit steering of the reflector or feed to provide precise pointing.

Such positioning of spacecraft payload elements has conventionally been performed, by, for example, linear or rotary actuators as illustrated in FIG. 1A and FIG. 1B, respectively. Referring to FIG. 1A, spacecraft main body structure 100 is coupled to reflector 120 by way of panel 110. Panel 110 may have a deployment hinge (not shown) proximate to spacecraft 100 to facilitate an initial deployment from a stowed (launch) configuration to a deployed (on-orbit) configuration. Operation of linear actuators 132 results in rotation of reflector 120 about each of two mutually orthogonal axes 136 and 138 defined by pivots 134. Referring now to FIG. 1B, rotation of reflector 120 in each of two mutually orthogonal axes 136 and 138 may, alternatively, be accomplished by way of two rotary actuators 140.

Positioning of spacecraft antenna reflectors and other appendages using the techniques described above, and variants thereof, has been used successfully. For spacecraft requiring larger reflectors and/or more stringent pointing requirements, however, such techniques are problematic. For example, in the rotary actuator implementation illustrated in FIG. 1B, rotary actuators 140, located near the spacecraft main body structure 100, are at a large distance from the center of gravity (c.g.) of reflector 120. This results in a low deployed natural frequency, and, consequently pointing performance degradation, because the moment of inertia of reflector 120 is large, particularly about axis of rotation 138.

Locating a positioning mechanism behind reflector 120 (nearer the c.g.) is sometimes possible, as illustrated in FIG. 1A. However, this increases the inertia about the deployment hinge and puts the actuators in a severe thermal environment. In addition, for certain types of unfurlable mesh reflectors, antenna backup structure 121, shown schematically in FIG. 1A, may be absent, or incompatible with an interface to linear actuators 132 and pivots 134.

Moreover, locating the actuators behind or at an edge of reflector 120, results in rotation of reflector 120 about a point substantially distant from an RF focal point of reflector 120, resulting in defocusing of payload beam and consequent performance degradation.

In light of the foregoing problems, improved payload positioning mechanisms are desirable.

SUMMARY OF INVENTION

The present inventor has recognized that a spacecraft payload element positioned by way of a mechanism consisting of a four-bar linkage may be rotated about a virtual pivot point (VPP) substantially distant from the actuator. Advantageously, the actuator may be configured such that the VPP is located proximate to the center of gravity and/or focal point of the payload element. In an embodiment, the location of the VPP may be selected independently of the payload element's structural configuration.

In an embodiment, the actuator may be located proximate to a supported edge of the payload element. Advantageously, the actuator provides a mechanical advantage (effectively a gear ratio) that increases the effective stiffness of an associated drive mechanism and reduces a step size of the drive mechanism, thereby increasing payload element positioning resolution.

In an embodiment, a spacecraft has a main body structure, a payload element, and a mechanism coupling the payload element to the main body structure, the mechanism being a four-bar linkage configured to rotate the payload element about a virtual pivot point (VPP) substantially distant from the mechanism.

In a further embodiment, the mechanism may be configured to locate the VPP proximate to at least one of a center of gravity and a focal point of the payload element. The four-bar linkage may be configured to rotate the payload element about a first axis of rotation, and the mechanism may include a rotary actuator configured to rotate the payload element about a second axis of rotation. Advantageously, the first axis of rotation may be orthogonal to the second axis of rotation and may intersect the second axis of rotation at a point proximate to the VPP. In an embodiment, the first axis of rotation may be substantially parallel to a pitch axis of the spacecraft and the second axis of rotation may be substantially parallel to a roll axis of the spacecraft In another embodiment, the mechanism may be located proximate to at least one of the main body structure and a supported edge of the payload element.

In a further embodiment, the mechanism may include an actuator for driving the four-bar linkage. The actuator may be a linear actuator or a rotary actuator.

In a yet further embodiment, the payload element may be an antenna reflector or an RF feed.

In an embodiment, a mechanism consists of a four-bar linkage configured to rotate a payload element about a virtual pivot point (VPP) substantially distant from the mechanism, the mechanism coupling the payload element to a structure. Advantageously, the mechanism may be configured to locate the VPP proximate to at least one of a center of gravity and a focal point of the payload element.

In a still further embodiment, a payload element may be coupled to a structure by a mechanism and configured to be rotated by the mechanism about a virtual pivot point (VPP) substantially distant from the mechanism, where the mechanism is a four-bar linkage. Advantageously, the mechanism may be configured to locate the VPP proximate to at least one of a center of gravity and a focal point of the payload element.

BRIEF DESCRIPTION OF THE DRAWINGS

Features of the invention are more fully disclosed in the following detailed description of the preferred embodiments, reference being had to the accompanying drawings, in which.

Figure 1A:
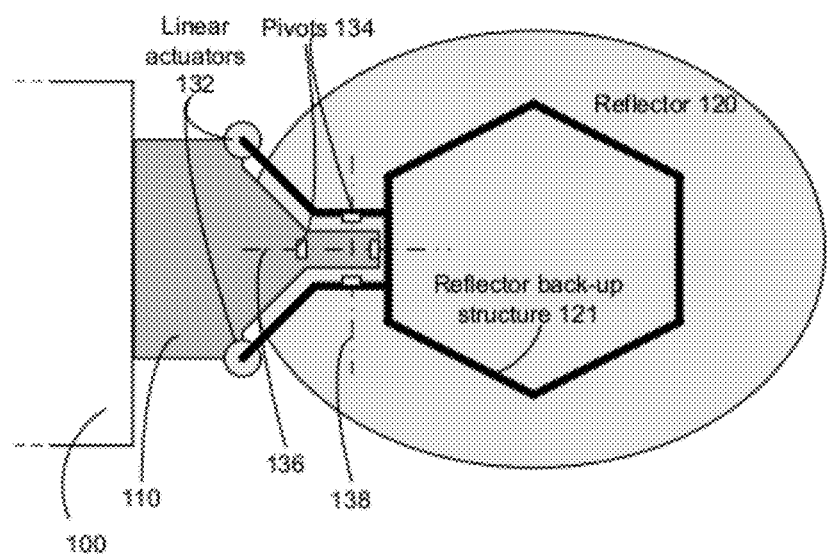
FIGS. 1A and 1B illustrate known antenna positioning techniques.
Figure 1B:
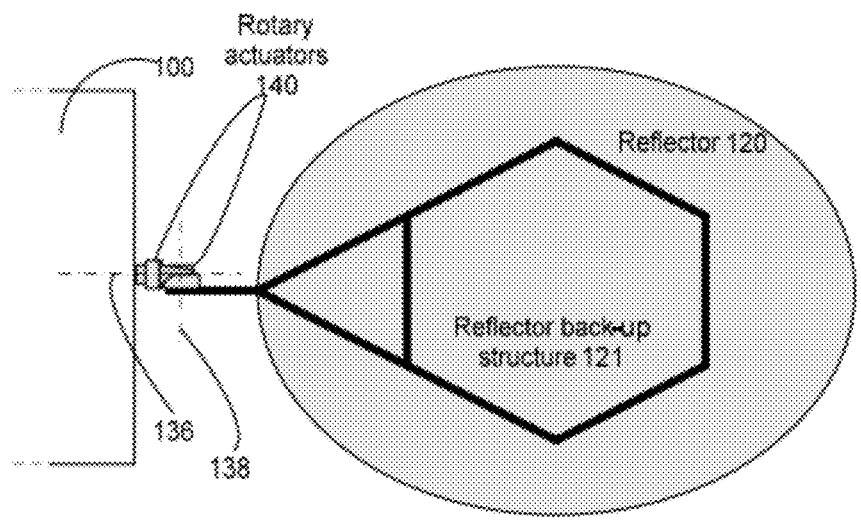

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

According to an embodiment of the presently disclosed techniques, a mechanism coupling a payload element to a spacecraft structure, may consist of a four-bar linkage configured to rotate the payload element with respect to a virtual pivot point (VPP) substantially distant from the mechanism.

Figure 2:
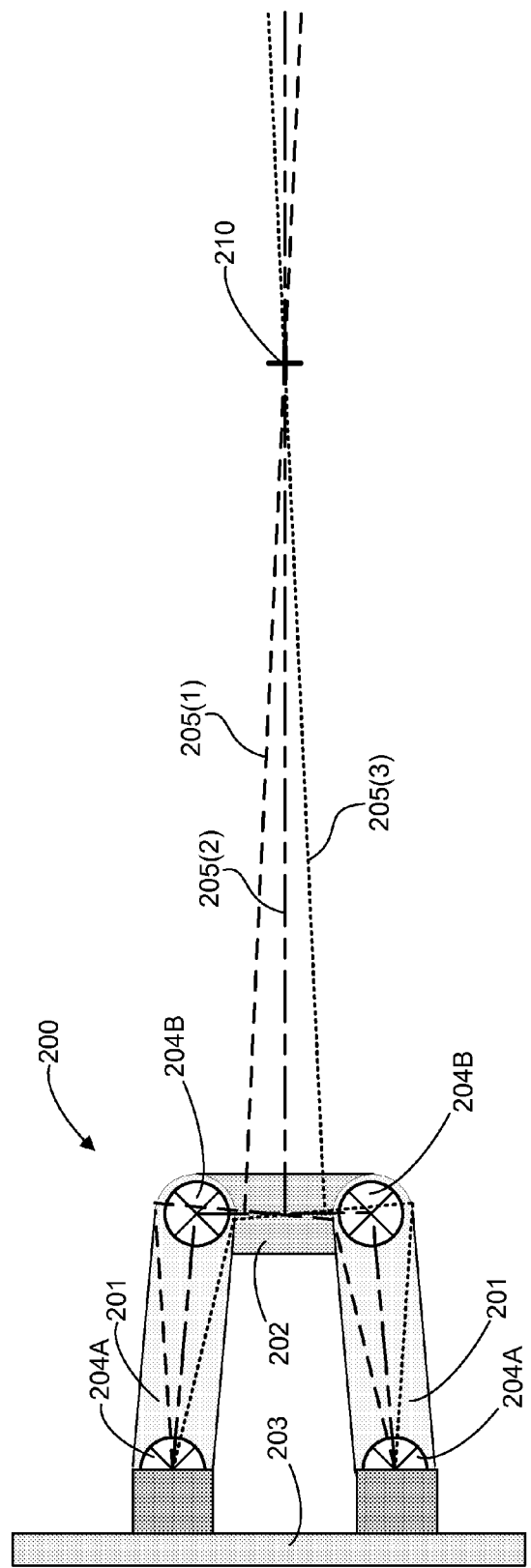
FIG. 2 illustrates a four-bar linkage according to an embodiment.

Understanding of the term virtual pivot point (VPP), as the term is used herein, and in the claims, may be enhanced by referring to FIG. 2, which illustrates that a four-bar linkage 200 may be configured to project a VPP 210 substantially distant from four-bar linkage 200. Four-bar linkage 200 may consist of two rotating members 201, each pivotally coupled: (i) proximate to an outboard end, by an outboard pivotal coupling 204B to a connecting link 202; and (ii) proximate to an inboard end, to fixed frame 203 by an inboard pivotal coupling 204A. Four-bar linkage 200 may be configured to permit motion of rotating members 201 and connecting link 202 within a predetermined range in a plane of rotation. Rotation of rotating members 201 about inboard pivotal couplings 204A will result in translation and rotation of connecting link 202. An imaginary axis 205, may be defined as a projected line within the plane of rotation, originating from a midpoint of connecting link 202 and orthogonal thereto. As rotating members 201 are rotated about inboard pivotal couplings 204A, resulting rotation and translation of connecting link 202 causes apparent rotation of imaginary axis 205 with respect to a virtual pivot point, VPP 210. For any rotation angle of rotating members 201, within a predetermined range of rotation angles, VPP 210 is defined as the single remote fixed point through which imaginary axis 205 passes. VPP 210 may be substantially distant and outboard of four-bar linkage 200.

Figure 3:
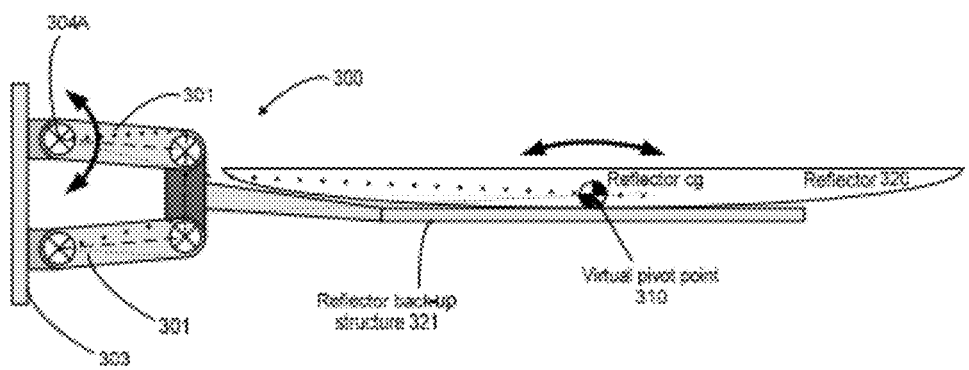
FIG. 3 illustrates an embodiment of an antenna reflector positionable by a four-bar linkage.

The present inventor has discovered that a four-bar linkage configured to have the properties described in the preceding paragraph may be advantageously employed to enable a payload element to be positioned with respect to a VPP. Referring now to FIG. 3, antenna reflector 320, for example, may be structurally coupled to four-bar linkage 300 by way of reflector back-up structure 321. In an embodiment, frame 303 may be mounted, directly or by way of an intermediate structure, to a spacecraft main body structure (not shown). Advantageously, rotation of a rotating member 301 about inboard pivotal coupling 304A results in rotation of antenna reflector 320 about VPP 310. Four-bar linkage 300 and reflector back-up structure 321 may be configured to locate VPP 310 substantially distant from four-bar linkage 300. For example, VPP 310 may approximately coincide with the reflector center of gravity (c.g.). By locating VPP 310 at or near the c.g. of antenna reflector 320, the inertia that must be overcome to position antenna reflector 320 may, advantageously, be minimized. Alternatively, four-bar linkage 300 and reflector back-up structure 321 may be configured to locate VPP 310 so as to approximately coincide with a focal point of antenna reflector 320, or any other desired location.

Figure 4A:
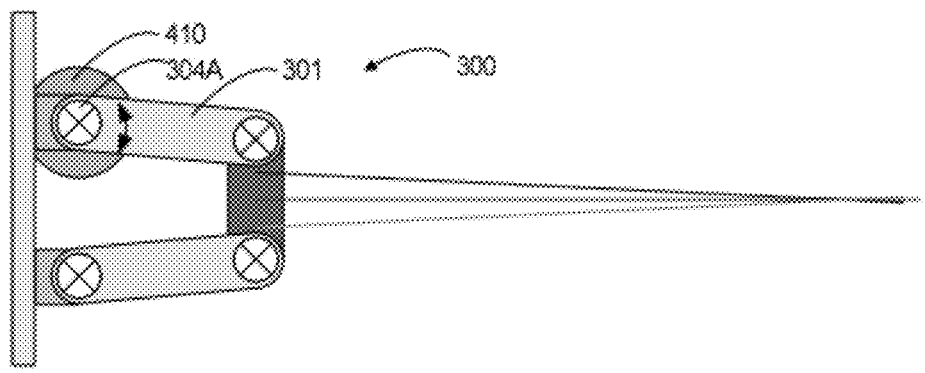
FIG. 4 illustrates mechanisms operable to drive an embodiment of a four-bar linkage.
Figure 4B:
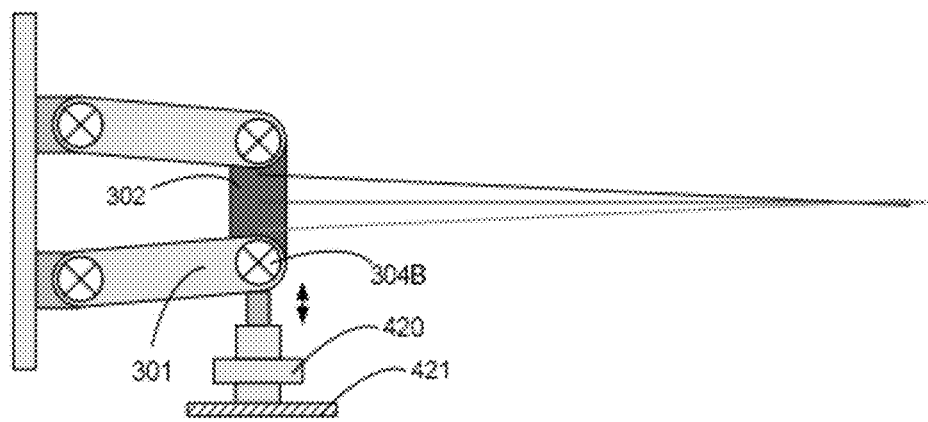
Figure 4C:
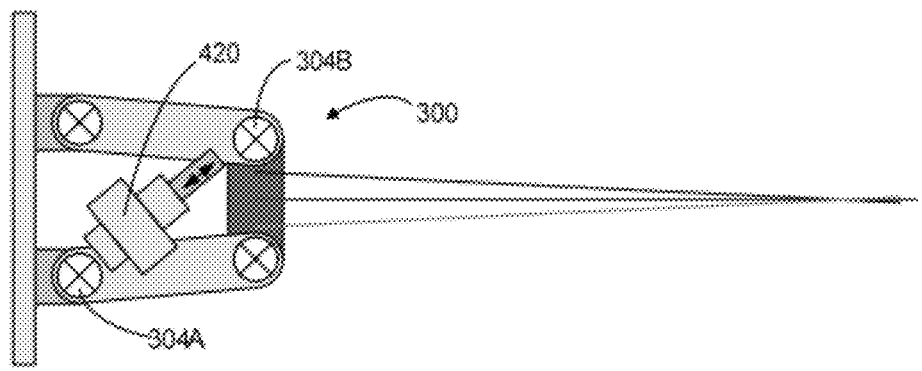

Four-bar linkage 300 may be driven by an actuator in a number of ways. In an embodiment illustrated in FIG. 4A, for example, rotary actuator 410 may drive four-bar linkage 300 by controlling rotation of a first rotating member 301 about inboard pivotal coupling 304A. In an embodiment illustrated in FIG. 4B, as a further example, linear actuator 420 may drive four-bar linkage 300 by controlling translation of connecting link 302. A first end of linear actuator 420 may be coupled to outboard pivotal coupling 304B; a second end of linear actuator 420 may be coupled to a spacecraft structure element 421. In an embodiment illustrated in FIG. 4C, as a yet further example, linear actuator 420 may drive four-bar linkage 300 by controlling a diagonal distance between inboard pivotal coupling 304A and outboard pivotal coupling 304B. Advantageously, using a linear actuator allows four-bar linkage 300 to be triangulated, resulting in a very rigid mechanism.

In an embodiment, four-bar linkage 300 may be configured to provide a mechanical advantage to rotary actuator 410 or linear actuator 420. The inventor has found that the mechanical advantage may range from about 5:1 to about 10:1. As a result, an actuator size requirement may be reduced. Advantageously, in addition, the mechanical advantage permits the actuator step size to be relatively large larger, while still providing fine pointing resolution at the reflector. For example, the inventor has found that a rotary actuator with a 0.009375° step size may provide a reflector step size of about 0.0015°.

Figure 5:
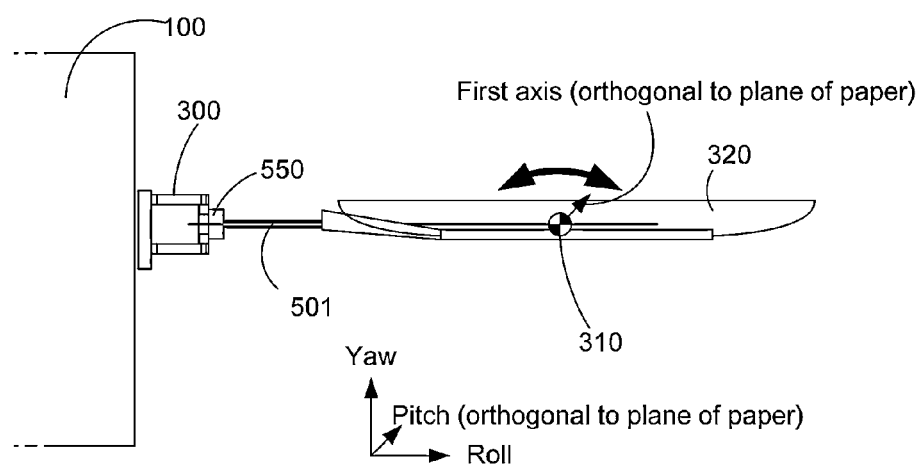
FIG. 5 illustrates an embodiment of an antenna reflector positionable by a four-bar linkage and a rotary actuator.

Referring now to FIG. 5, four-bar linkage 300 may be configured to rotate antenna reflector 320 around a first axis intersecting virtual pivot point 310. The first axis, nominally parallel to the pitch axis of spacecraft 100, is orthogonal to the plane of FIG. 5. In an embodiment, rotary actuator 550 may be configured to rotate at least antenna reflector 320 about a second axis, axis 501, orthogonal to the first axis, and nominally parallel to the roll axis of spacecraft 100. In an embodiment, the reflector may be rotated about both the first axis and axis 501. Four-bar linkage 300 may advantageously provide rotation about the first axis. Because axis 501 typically passes through or near the reflector c.g., the inertia about axis 501 is relatively low. As a result, rotary actuator 550 may advantageously provide rotation about axis 501 as illustrated in FIG. 5. Four-bar linkage 300 and rotary actuator 550 may, therefore, provide positioning with respect to two orthogonal axes, both of which pass through or near the c.g. of antenna reflector 320.

Figure 6:
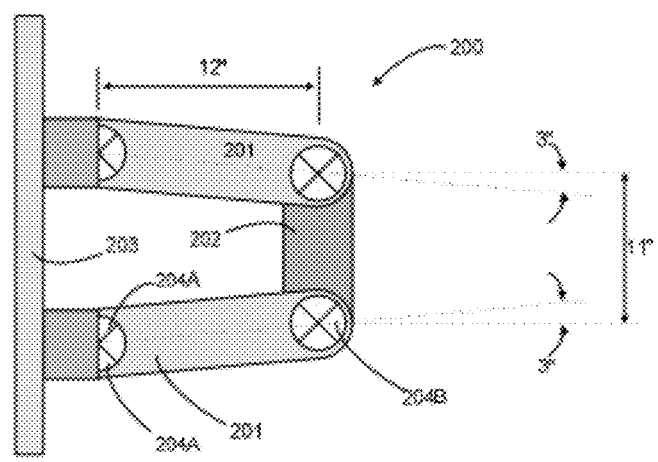
FIG. 6 illustrates a further embodiment of a four-bar linkage.

Referring now to FIG. 6 an embodiment of four-bar linkage 200 is illustrated, suitable for positioning a five meter diameter antenna reflector (not shown). A VPP (not shown) that is located approximately 2.5 meters distant from four-bar linkage 200 may be provided by the illustrated embodiment.

Figure 7:
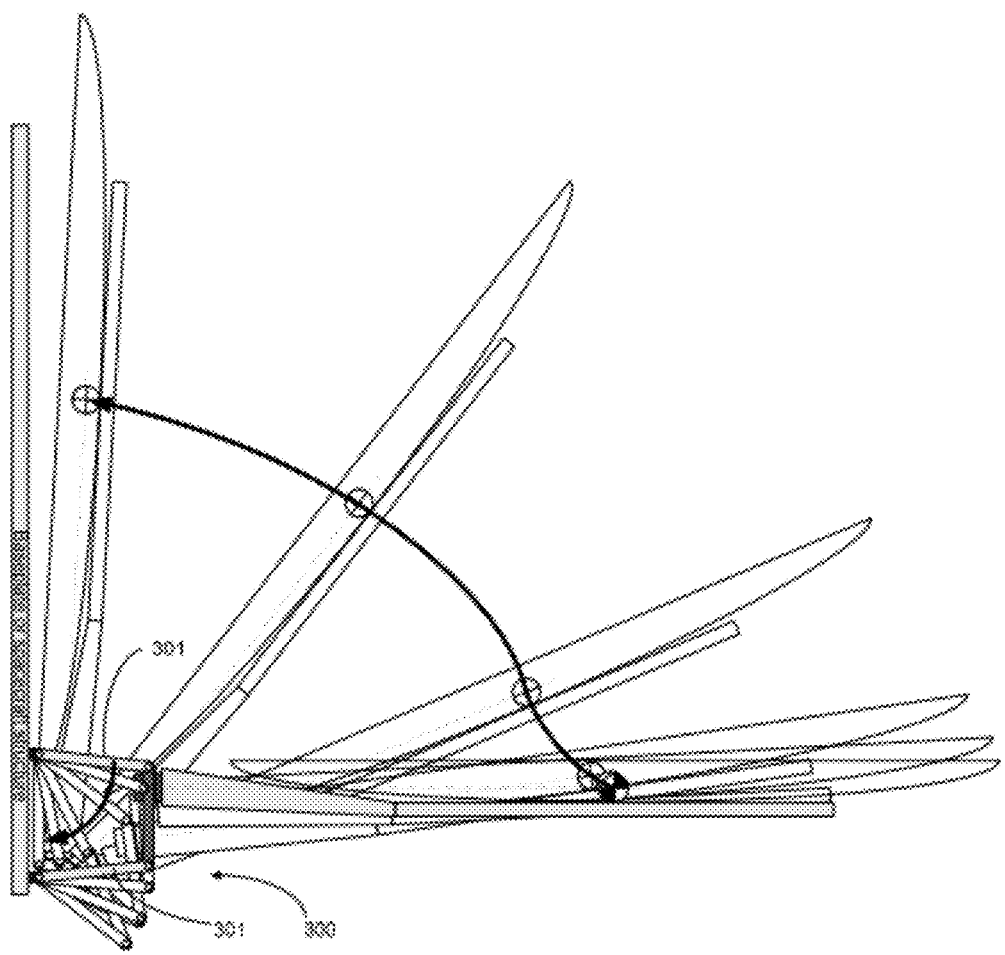
FIG. 7 illustrates an embodiment of an antenna reflector undergoing initial deployment by a four-bar linkage.

In an embodiment, as illustrated in FIG. 7, a mechanism including four-bar linkage 300 may be used to stow and deploy antenna reflector from the sides of spacecraft. By rotating the rotating members 301 approximately 90 degrees, the attached reflector will rotate about 90 degrees in the opposite direction. The same mechanism may, advantageously, thereafter perform on-orbit steering operations.

Figure 8:
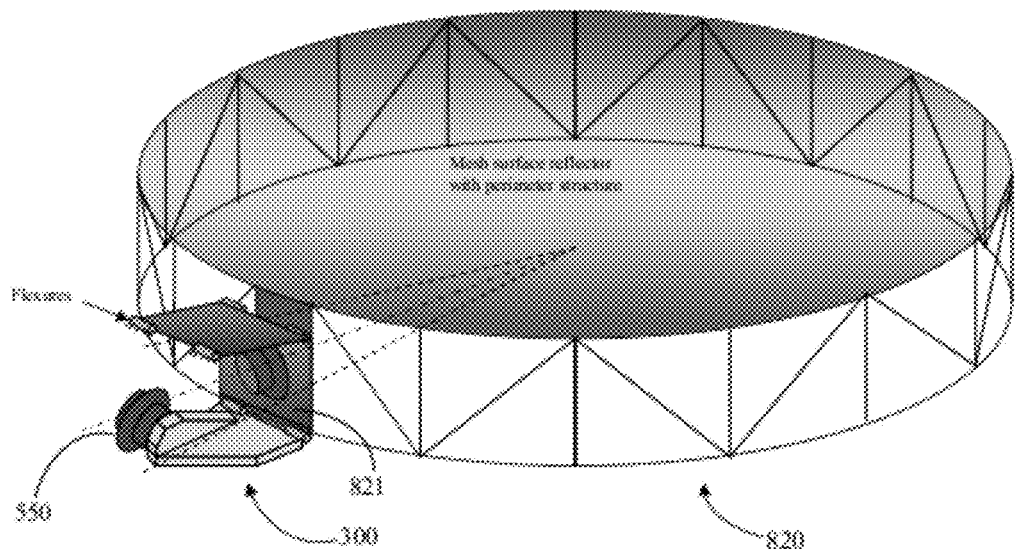
FIG. 8 illustrates an embodiment of a mesh surface antenna reflector positionable by a four-bar linkage and a rotary actuator.

Referring now to FIG. 8, an embodiment is illustrated that demonstrates how a mechanism including four-bar linkage 300 may be located proximate to a supported edge 821 of, for example, mesh surface reflector 820. The four bar linkage may be attached to an appropriate part of the spacecraft structure or a deployment boom. In an embodiment, four bar linkage 300 may be driven by rotary actuator 550. Rotary actuator 550 may have a relatively high stiffness and a small step size (such as a MOOG Type 3 actuator). In an embodiment, linkages of the four bar system may be stiff plates. Advantageously, the plates may be pivotally coupled by flexures. The flexures may be configured to provide high stiffness and minimal backlash to maximize pointing accuracy.

Figure 9:
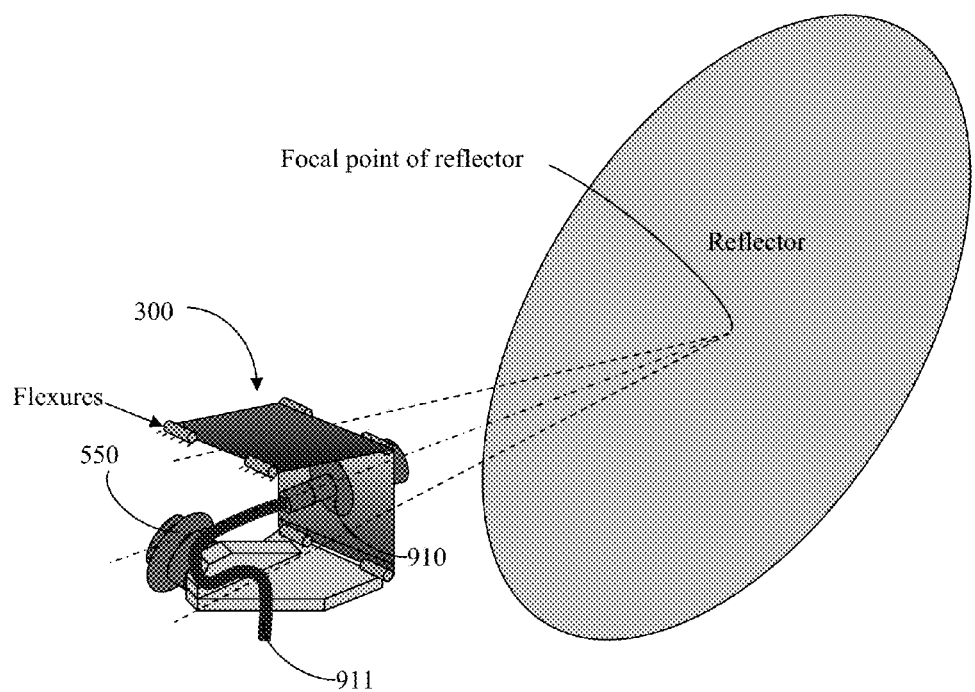
FIG. 9 illustrates an embodiment of an RF feed positionable by a four-bar linkage.

In addition to positioning antenna reflectors, this invention can be used to position other components such as an antenna feed, imaging sensor or other spacecraft equipment. For example, RF beam steering may be accomplished by moving either an antenna reflector or its associated RF feed. In instances where it is desired to move the RF feed with respect to the reflector, avoidance of defocusing or beam spillage may be provided by moving the feed about the reflector focal point. As illustrated in FIG. 9, RF feed 910 may be connected to flexible waveguide 911. In an embodiment, movement of RF feed 910 in an approximate arc about the reflector focal point is enabled. In the illustrated embodiment, four bar linkage 300 may be controlled by rotary actuator 550.

Figure 10:
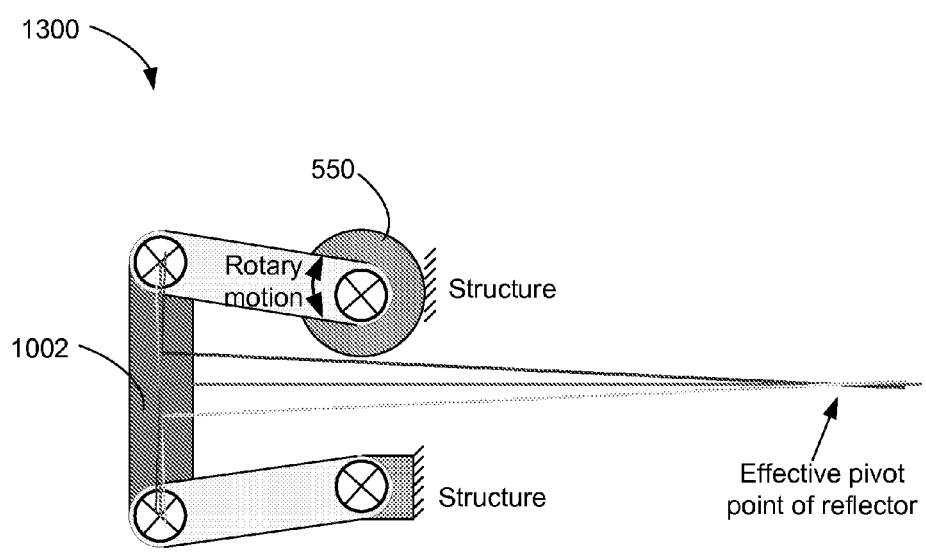
FIG. 10 illustrates yet another embodiment of a four bar linkage.

Referring now to FIG. 10, in an embodiment, four-bar linkage 1300 may be arranged in an "inverted" configuration, wherein the "outboard" pivot points are disposed proximate to an external wall of a spacecraft structure. Actuation of the four-bar linkage by, for example, rotary actuator 550 results in translation and rotation of connecting link 1002, which is disposed "inboard" with respect to the spacecraft structure.

Although the embodiments described above relate to providing spacecraft payload element positioning with respect to a virtual pivot point, the teachings of the present disclosure are not so limited. Payload elements may be positioned using the present teachings, with respect to any type of structure or vehicle, including, for example, aircraft, ships, and motor vehicles.

Thus, payload element positioning techniques have been disclosed, wherein a mechanism couples the payload element a structure, the mechanism being a four-bar linkage configured to rotate the payload element about a virtual pivot point (VPP) substantially distant from the mechanism.

What is claimed is:

1. A spacecraft comprising:
   a main body structure;
   a payload element; and
   a mechanism, said mechanism coupling the payload element to the main body structure, and comprising a four-bar linkage, the four-bar linkage comprising a first rotating member, having a first inboard end and a first outboard end, and a second rotating member, having a second inboard end and a second outboard end; wherein
   the mechanism is configured to stow and deploy the payload element by rotating the first and second rotating members by up to approximately 90 degrees;
   the first rotating member is pivotally coupled, in a plane of rotation, proximate to the first outboard end, to a first pivot point of a connecting link and pivotally coupled, within the plane of rotation, proximate to the first inboard end, to the main body structure;
   the second rotating member is pivotally coupled, in the plane of rotation, proximate to the second outboard end, to a second pivot point of the connecting link and pivotally coupled, within the plane of rotation, proximate to the second inboard end, to the main body structure;
   the four-bar linkage defines a linkage axis, the linkage axis being a projected line within the plane of rotation, orthogonal to the connecting link and originating from a midpoint of the connecting link; and
   the four-bar linkage is configured to rotate the payload element, after the payload element is deployed, about a virtual pivot point (VPP) substantially distant from the mechanism the VPP being a single point through which the linkage axis passes for any rotation angle of the first and second rotating member within a predetermined range, greater than zero, of rotation angles.

2. The spacecraft according to claim 1, wherein the payload element is an antenna reflector and the mechanism is configured to locate the VPP proximate to at least one of a center of gravity and a focal point of the antenna reflector.

3. The spacecraft according to claim 1, wherein
   the four-bar linkage is configured to rotate the payload element about a first axis of rotation; and
   the mechanism further comprises a rotary actuator configured to rotate the payload element about a second axis of rotation.

4. The spacecraft according to claim 3, wherein the first axis of rotation is orthogonal to the second axis of rotation and intersects said second axis of rotation at a point proximate to the VPP.

5. The spacecraft according to claim 4, wherein the first axis of rotation is substantially parallel to a pitch axis of the spacecraft and the second axis of rotation is substantially parallel to a roll axis of the spacecraft.

6. The spacecraft according to claim 1, wherein the mechanism is located proximate to at least one of the main body structure and a supported edge of the payload element.

7. The spacecraft according to claim 1, wherein the mechanism comprises an actuator for driving the four-bar linkage.

8. The spacecraft according to claim 7, wherein the actuator is a linear actuator or a rotary actuator.

9. The spacecraft according to claim 1, wherein the payload element is an RF feed illuminating an antenna reflector and the mechanism is configured to locate the VPP proximate to a focal point of the reflector.

10. A mechanism comprising a four-bar linkage configured to rotate a payload element about a virtual pivot point (VPP) substantially distant from the mechanism, said mechanism coupling the payload element to a structure, and comprising a four-bar linkage, the four-bar linkage comprising a first rotating member, having a first inboard end and a first outboard end, and a second rotating member, having a second inboard end and a second outboard end, wherein:
  the mechanism is configured to stow and deploy the payload element by rotating the first and second rotating members by up to approximately 90 degrees;
  the first rotating member is pivotally coupled, in a plane of rotation, proximate to the first outboard end, to a first pivot point of a connecting link and pivotally coupled, within the plane of rotation, proximate to the first inboard end, to the main body structure;
  the second rotating member is pivotally coupled, in the plane of rotation, proximate to the second outboard end, to a second pivot point of the connecting link and pivotally coupled, within the plane of rotation, proximate to the second inboard end, to the main body structure;
  the four-bar linkage defines a linkage axis, the linkage axis being a projected line within the plane of rotation, orthogonal to the connecting link and originating from a midpoint of the connecting link; and
  the four-bar linkage is configured to rotate the payload element, after the payload element is deployed, about a virtual pivot point (VPP) substantially distant from the mechanism the VPP being a single point through which the linkage axis passes for any rotation angle of the first and second rotating member within a predetermined range, greater than zero, of rotation angles.

11. The mechanism according to claim 10, wherein the payload element is an antenna reflector and the mechanism is configured to locate the VPP proximate to at least one of a center of gravity and a focal point of the antenna reflector.

12. The mechanism according to claim 10, wherein
  the four-bar linkage is configured to rotate the payload element about a first axis of rotation; and
  the mechanism further comprises a rotary actuator configured to rotate the payload element about a second axis of rotation.

13. The mechanism according to claim 12, wherein the first axis of rotation is orthogonal to the second axis of rotation and intersects said second axis of rotation at a point proximate to the VPP.

14. The mechanism according to claim 13, wherein the structure comprises a vehicle having a pitch axis and a roll axis, the first axis of rotation is substantially parallel to the pitch axis of the vehicle, and the second axis of rotation is substantially parallel to the roll axis of the vehicle.

15. The mechanism according to claim 10, wherein the mechanism is located proximate to at least one of the structure and a supported edge of the payload element.

16. The mechanism according to claim 10, wherein the mechanism comprises an actuator for driving the four-bar linkage.

17. The mechanism according to claim 16, wherein the actuator is a linear actuator or a rotary actuator.

18. The mechanism according to claim 10, wherein the payload element is an RF feed illuminating an antenna reflector and the mechanism is configured to locate the VPP proximate to a focal point of the reflector.

19. A payload element, said payload element coupled to a structure by a mechanism and configured to be rotated, after the payload element is deployed, by the mechanism about a virtual pivot point (VPP) substantially distant from the mechanism, said mechanism comprising a four-bar linkage, the four-bar linkage comprising a first rotating member, having a first inboard end and a first outboard end, and a second rotating member, having a second inboard end and a second outboard end; wherein
  the mechanism is configured to stow and deploy the payload element by rotating the first and second rotating members by up to approximately 90 degrees;
  the first rotating member is pivotally coupled, in a plane of rotation, proximate to the first outboard end, to a first pivot point of a connecting link and pivotally coupled, within the plane of rotation, proximate to the first inboard end, to the main body structure;
  the second rotating member is pivotally coupled, in the plane of rotation, proximate to the second outboard end, to a second pivot point of the connecting link and pivotally coupled, within the plane of rotation, proximate to the second inboard end, to the main body structure;
  the four-bar linkage defines a linkage axis, the linkage axis being a projected line within the plane of rotation, orthogonal to the connecting link and originating from a midpoint of the connecting link; and
  the VPP is a single point through which the linkage axis passes for any rotation angle of the first and second rotating member within a predetermined range, greater than zero, of rotation angles.

20. The payload element according to claim 19, wherein the payload element is an antenna reflector and the mechanism is configured to locate the VPP proximate to at least one of a center of gravity and a focal point of the antenna reflector.

21. The payload element according to claim 19, wherein
  the four-bar linkage is configured to rotate the payload element about a first axis of rotation; and
  the mechanism further comprises a rotary actuator configured to rotate the payload element about a second axis of rotation.

22. The payload element according to claim 21, wherein the first axis of rotation is orthogonal to the second axis of rotation and intersects said second axis of rotation at a point proximate to the VPP.

23. The payload element according to claim 22, wherein the structure comprises a vehicle having a pitch axis and a roll axis, the first axis of rotation is substantially parallel to the pitch axis of the vehicle, and the second axis of rotation is substantially parallel to the roll axis of the vehicle.

24. The payload element according to claim 19, wherein the mechanism is located proximate to at least one of the main body structure and a supported edge of the payload element.

25. The payload element according to claim 19, wherein the mechanism comprises an actuator for driving the four-bar linkage.

26. The payload element according to claim 25, wherein the actuator is a linear actuator or a rotary actuator.

27. The payload element according to claim 19, wherein the payload element is an RF feed illuminating an antenna reflector and the mechanism is configured to locate the VPP proximate to a focal point of the reflector.

* * * * *